July 3, 1951

J. B. CARROLL 2,559,111

MEASURING TAPE AND THE LIKE

Filed April 25, 1947

INVENTOR.
John B. Carroll

Patented July 3, 1951

2,559,111

UNITED STATES PATENT OFFICE 2,559,111

MEASURING TAPE AND THE LIKE

John B. Carroll, Oak Park, Ill.; John B. Carroll, Jr., and Jessie C. Carroll executors of said John B. Carroll, deceased Application April 25, 1947, Serial No. 743,943

1 Claim. (Cl. 242—84.9)

This invention relates to improvements in measuring tapes, and the like. Specifically the present invention relates to improvements in spring wound measuring tapes, that is, that type of such tapes in which provision is made for rewinding the tape by means of a spring contained within the tape winding drum. Various forms of spring wound measuring tapes have heretofore been devised. The present improvements relate to the means whereby the rewinding of the spring drum is controlled in simple fashion to permit the tape to be rewound; and said improvements also relate to the construction of the drum and the enclosure or housing wherein said drum is contained.

It is an object of the invention to provide a very simple form of construction, one which is readily formed from sheet metal parts of simple form, and which are readily assembled and to provide a construction of measuring tape and rewind therefor which may be produced in quantities at very low cost for both labor and materials.

In the drawing:

Figure 2 being taken substantially on the line 2—2 of Figure 1, looking in the direction of the arrows;

Figure 1:
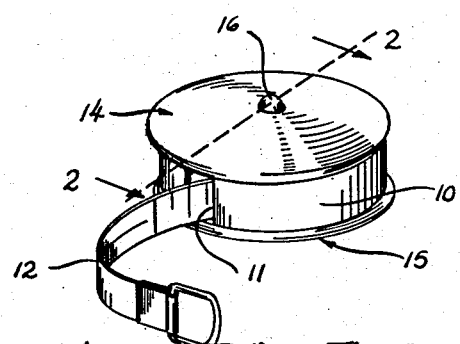
Figure 1 shows a perspective view of a measuring tape unit embodying the features of my present invention, this view looking towards the tape slot of the housing, and towards the releasing button whereby the drum may be released to permit the spring to rewind the tape, a length of tape projecting from the housing.

Referring to the various figures, the present device includes the cylindrical or barrel shaped housing 10, provided with the slotted opening 11 through which extends the tape line 12. The end of this tape line is provided with the looped grip 13 by which the end of the tape is readily grasped to withdraw such tape length as may be desired. The barrel shaped housing is provided with the top and bottom covers 14 and 15, respectively, these covers being secured to the barrel housing proper by a crimping operation, as will be presently explained; and from the central portion of the top cover there projects slightly the button 16 which, when slightly depressed serves to release the spring urged drum to permit the spring to rotate said drum and thus to rewind the previously projected tape length.

Figure 3:
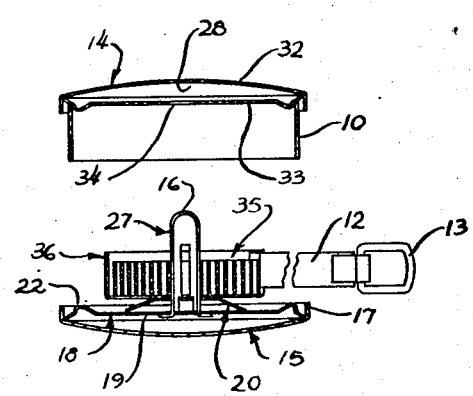
Figure 3 shows an exploded cross-section also taken substantially on the line 2—2 of Figure 1, and similar to the view of Figure 2, but in Figure 3 the barrel and the cover section of the housing being raised to show the method of assembly.
Figure 2:
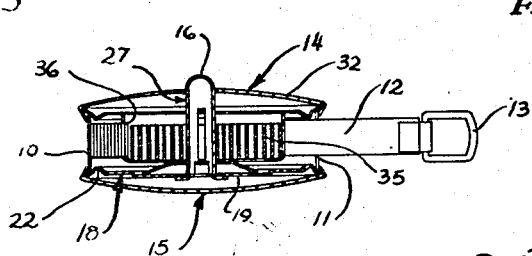
Figure 2 shows a cross-section through the device of Figure 1, the releasing button being in its undepressed position to permit the locking spring to frictionally lock the drum.
Figure 4:
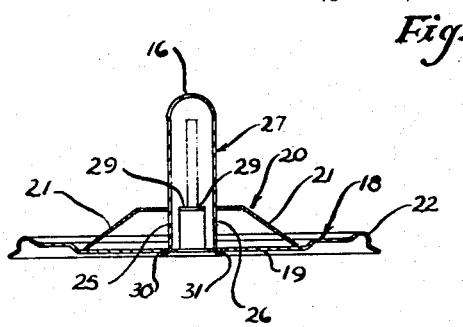
Figure 4 shows on enlarged scale the lower housing assembly unit, prior to placement of the lower face plate in place, and prior to placement of the drum and spring assembly and the housing barrel and cover plate in place.
Figure 5:
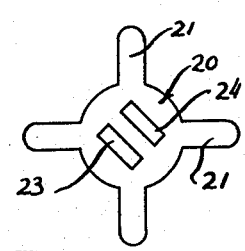
Figure 5 shows on enlarged scale a top or plan view of the drum shifting spring.

Referring now to Figures 2, 3 and 4, the lower or bottom plate 15 is preferably formed of slightly concavo-convex form, with its concavity facing towards the interior of the housing. The edge of this plate is provided with the flange 17 which may be crimped over to firmly engage the companion parts when the housing is to be assembled. Seated upon the concave face of this plate 15 is the circular plate 18. This plate 18 is provided with the central slightly recessed annular portion 19 against which may be set the fingers of the spring element 20. These fingers 21 are formed by stamping the element 20 from a blank of spring sheet metal, and forming the fingers into a downwardly extending shape so that when the tips of these fingers are set into the depressed or recessed portion 19 the central portion of the element 20 will stand above and separated from the face of the plate 18 as shown in Figure 4 in particular. However, due to the spring nature of the fingers the top or body portion of this element 20 may be depressed when the winding drum is to be released to rewind the tape. The element 18 is also provided with the encircling rib or corrugation 22 which lies close to the periphery of the element 18 as well shown in Figure 4.

The spring element 20 is provided with the two slots 23 and 24 through which are extended the fingers 25 and 26 of the lower end portion of the shaft element 27, this shaft element extending up through the hole 28 in the top cover 14, and comprising the button 16. These fingers 25 and 26 are shouldered as shown at 29 so that when the button is depressed these shoulders will press against the top face of the spring (or against the floor of the drum) so that when the button 16 is depressed the drum and spring will be forced slightly towards the annular portion 19 of the element 18. The extent of such movement need be slight to ensure disengagement of the drum to cause its release for winding purposes as presently explained. The extreme ends of the fingers 25 and 26 are passed through slotted openings 30 and 31 of the element 18, and are slightly deflected as shown in Figures 2, 3 and 4, so that outward movement of the shaft element 27 is limited; but the fingers do not engage the element 18 with sufficient firmness or closeness to interfere with free movement of the shaft element with respect to the element 18 when said shaft element is forced downwardly by pressing against the button portion 16.

The top cover 14 is formed from the concavo-convex plate 32 having its edge flanged as well shown in Figure 3; and the element 33 is set into the concave portion of this element 32, and the parts may be secured together by crimping the edge of the concavo-convex element after the parts have been assembled, as will presently appear. The element 33 is provided with the shaft receiving opening 34 in alignment with the opening 28 already referred to.

A spiral spring element 35 is wound within the drum element 36. This spring element comprises a length of spring tape having its outer end connected to the flange of the drum, and its inner end connected to the shaft element 27. For this purpose there is provided a slot in the flange of the drum through which a short length of the outer end of the spring tape extends and is then bent over against the outer face of the drum flange; and the shaft element is provided with a slot through which a short length of the inner end of the spring tape is passed and is then bent over within the hollow shaft element. Thus the spring acts between the drum flange and the shaft element to exert its force. Since the fingers 25 and 26 of the shaft element are extended through slots of the element 19 which comprises a portion of the lower head element, it follows that the spiral spring in reality acts between the drum flange and the housing of the device.

The measuring tape 12 extends through the slot 11 of the barrel shaped housing, and the inner end of this tape is connected to the drum flange of the drum 36, and winds thereon as the drum rotates under the force of the spring 35 when the button 16 is depressed. When the parts are assembled the drum flange is pressed against the inner face of the element 33 by action of the spring element 20 with a force sufficient to lock the drum against rotation under the force of the spring element 35; but when the button 16 is depressed slightly the pressure of the drum flange against said element 33 is relieved so that the spring element 35 is effective to rotate the drum and wind the measuring tape on the drum flange. The measuring tape may be unwound by drawing outwardly by gripping the loop 13, the frictional engagement between the drum flange and the element 33 under the force of the spring element 20 not being sufficient to prevent such out drawing of the measuring tape, by manual force, even when the button 16 is not depressed.

With the parts assembled to the forms shown in Figure 3 the edge portion of the element 32 may be crimped against the barrel portion 10, thus locking the upper head portion and the barrel together. This assembly may then be set down over the assembled parts comprising the lower head element and the spring element 20, shaft element 27, and drum element, with the contained spiral spring, and the measuring tape wound on the drum flange, it being noted that under these conditions of assembly the measuring tape will be wound on the exterior of the drum flange, and the spiral spring will be relaxed or unwound, but within the flange of the drum. During such downward setting of the upper head element and the body of the housing, the measuring tape should be extended into the slot of the barrel housing, as shown at 11. Having thus assembled all the parts the flange portion 17 of the bottom head element may be crimped over to engage the barrel body portion, thus completing the assembling operations, and locking the parts into final or completed form.

Figure 6:
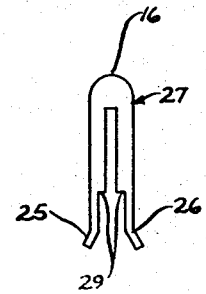
Figure 6 shows in elevation a detail view of the shaft element; both Figures 5 and 6 being on enlarged scale as compared to the other figures.

It may be noted that the shaft element conveniently takes the form of a blank of sheet metal cut to proper form, and formed into substantially semi-circular cross-section, and then doubled on itself into the form shown in Figures 4 and 6 in particular. It is also noted that the concavo-convex form of the lower or bottom head element 15 establishes a space between the central portion of such concavo-convex element and the plate or element 19 which space will sufficiently receive the prongs or fingers 25 and 26 of the shaft element when the button is depressed, to enable free rotation of the drum thus released from frictional hold-back.

It is pointed out that the structural arrangements herein disclosed adapt themselves admirably to forming and assembling small units such as measuring tapes for household and like uses; and that the means herein disclosed for causing retention of the drum against the winding action of the spiral spring, and for releasing the drum when the said tape is to be wound serve admirably for these units of relatively small size.

While I have herein shown and described only a single embodiment of the features of my present invention, still I do not intend to limit myself thereto, except as I may do so in the claim to follow.

I claim:

As a new article of manufacture, a measuring tape assembly of the spring retracted type, comprising in combination a hollow winding drum having a bottom head and a cylindrical tape winding flange in connection with said bottom head, a cylindrical housing within which said winding drum is located coaxially with said housing, said housing including an encircling cylindrical body element having an axially extending tape slot together with top and bottom head elements and means to secure the cylindrical body element and the head elements together, a plate located within the bottom head element and the adjacent portion of the cylindrical body element and having its central portion spaced from the central portion of the bottom head element, an axially shiftable stud within the housing and extending axially through the drum and through the top head element to provide an operating button externally of the top head element, a non-circular opening in the bottom head element plate, the lower portion of the stud extending through said non-circular opening and being axially shiftable with respect to the said plate and non-rotatable with respect to said bottom head element, a spring element located between the bottom head of the drum and the said plate of the bottom head element and exerting a separating force between said parts urging the drum upwards to bring its cylindrical tape winding flange into frictional engagement with a portion of the top circular head element of the housing to lock the drum against rotation with respect to the housing, said spring element comprising a spring sheet metal plate including a central portion in engagement with the stud and also having a plurality of outwardly extending fingers located at substantially equal angular separation from each other around said spring sheet metal plate and having their outer end portions in engagement with the bottom head plate aforesaid to thereby exert a direct upward thrust against the stud and to thereby exert a direct upward thrust against the winding drum in direction parallel to the axis of drum rotation a spiral retracting spring within the drum, a connection between the outer end of said spring and the drum flange, a connection between the inner end of the spring and said stud, and a measuring tape having one end connected to the drum flange and extending through the tape slot of the housing, substantially as described.

JOHN B. CARROLL.

REFERENCES CITED

The following references are of record in the file of this patent:

UNITED STATES PATENTS

| Number | Name | Date |
|---|---|---|
| 959,750 | Joseph | May 31, 1910 |
| 1,281,088 | Smith | Oct. 8, 1918 |
| 2,080,815 | Gasstrom | May 18, 1937 |
| 2,172,043 | Wolf | Sept. 5, 1939 |